United States Patent [19]

Yamamura

[11] 4,357,023
[45] Nov. 2, 1982

[54] FERROFLUID ROTARY-SHAFT SEAL APPARATUS AND METHOD

[75] Inventor: Akira Yamamura, Framingham, Mass.

[73] Assignee: Ferrofluidics Corporation, Nashua, N.H.

[21] Appl. No.: 208,289

[22] Filed: Nov. 19, 1980

[51] Int. Cl.$^3$ .................................................. F16J 15/40
[52] U.S. Cl. .................................. 277/1; 277/80; 277/135
[58] Field of Search ............... 277/1, 80, 135, DIG. 7; 308/10, 36.1, 187.1, 187.2

[56] References Cited

U.S. PATENT DOCUMENTS 4,304,411 12/1981 Wilcock et al. .................. 277/25 X

FOREIGN PATENT DOCUMENTS 783881 10/1957 United Kingdom ................. 277/80
631726 11/1978 U.S.S.R. ............................. 277/80
742657 6/1980 U.S.S.R. ............................. 277/80

*Primary Examiner*—Robert S. Ward, Jr.
*Attorney, Agent, or Firm*—Richard P. Crowley

[57] ABSTRACT

A ferrofluid rotary-shaft seal apparatus of extended seal life, particularly adapted for use as an exclusion seal with a computer-disc-drive spindle, which seal apparatus comprises: an annular permanent magnet; first and second pole pieces, one end of which pole pieces extends into a close, noncontacting relationship with the surface of the rotary shaft to form a gap therebetween; ferrofluid in the gap to form at least one O-ring seal; and a heat-conductive sheet material in a close, heat-conducting relationship with at least one pole piece, to aid in removing heat from the ferrofluid in the gap, thereby extending the seal-apparatus life in use.

16 Claims, 2 Drawing Figures

FERROFLUID ROTARY-SHAFT SEAL APPARATUS AND METHOD

BACKGROUND OF THE INVENTION

Ferrofluid-type seal apparatuses for use in sealing rotary shafts, with single- and multiple-stage, ferrofluid-liquid, O-ring seals about the shaft, are well known (see, for example, U.S. Pat. No. 3,620,584 which describes a multiple-stage, ferrofluid, rotary-shaft seal).

Single- and multiple-stage ferrofluid seals have been used as exclusion seals, to protect one environment on one side of the shaft from contaminants in an environment on the other side of the shaft. Ferrofluid-type exclusion seals are useful particularly with computer-disc-drive spindles, to prevent contaminants in an environment from reaching a memory-disc area.

One standard ferrofluid exclusion seal presently employed in the computer field comprises an annular, ring-like, permanent magnet adapted to surround the spindle shaft and sandwiched between two, identical, pole-piece elements which are placed at the outer diameter into a contacting, magnetic-flux relationship with the one and the other polar ends of the permanent magnet. The inner diameter of the pole-piece elements extends into a close, noncontacting relationship with the surface of the shaft or spindle, to form a small gap for example, 2 to 10 mils, between the inner diameter of the pole piece elements and the shaft surface. A ferrofluid is disposed and magnetically retained in the gaps on the insertion of the magnetically permeable shaft or spindle, to form one or more liquid O-ring stages, which serve to form a ferrofluid exclusion seal about the shaft.

A wide variety of magnetic materials may be used to provide the permanent magnet, but usually the material is a sintered or bonded ceramic material having a longitudinal thickness of about 80 to 150 mils. The pole-piece elements are composed of magnetically permeable material, such as magnetic stainless steel (for example, 400 series), and range in thickness from about 25 to 80 mils. The standard exclusion seal, depending on customer requirements, is provided as described or placed in a nonmagnetic housing, such as of aluminum or stainless steel (for example, 300 series), such as by bonding- or staking-assembly techniques.

The exclusion seal is formed by placing a precise, optimum amount of a ferrofluid in the annular gap regions between the inner diameter of the pole pieces and the spindle shaft. Typically, the ferrofluid comprises a low-vapor-pressure carrier liquid, such as a fluorocarbon, a polyphenylether, a hydrocarbon, a diester liquid and similar low-vapor-pressure liquids, to provide for a very low mass loss of the ferrofluid forming the O-ring seal, thereby providing an exclusion seal of long operating life. For example, the standard ferrofluid exclusion seal is expected generally to last for several years under moderate temperature conditions and with the currently used computer-disc-drive-spindle speeds of 3600 rpm and with shaft diameters up to about 1.8 inches. The ferrofluid used may vary in viscosity, and the saturation magnetization, which usually ranges from 20 to 500 cps, and 100 to 400 gauss respectively.

It is desirable to extend the useful operating life of ferrofluid exclusion seals, particularly under higher ambient-temperature conditions; for example, greater than 50° C., at spindle speeds that exceed 3600 rpm, and for larger shaft diameters, or a combination of these conditions.

SUMMARY OF THE INVENTION

The invention relates to a ferrofluid-type, rotary-shaft seal having an extended life and to the method of manufacturing and using such seal apparatus. In particular, the invention concerns a ferrofluid exclusion seal particularly useful with and in sealing computer-disc-drive spindles for extended time periods.

In a standard ferrofluid exclusion seal, it has been found that there are two basic design considerations—one magnetic, which determines the seal pressure, and the other heat-generation, which determines the seal life span.

Generally, the total pressure capacity of the current ferrofluid exclusion seals ranges from about 30 to 60 inches of water divided approximately equally between the two pole pieces. The pressure requirement for the usual disc-drive application is only 5 inches of water; thus, the seals have a large safety margin when it comes to pressure. In fact, even one ferrofluid O-ring seal is more than adequate to yield the required pressure capacity; however, in the present, standard design, there are two pole pieces, so that the magnetic-flux circuit will be complete.

It is known that a temperature gradient across the ferrofluid O-ring seal is produced, as a result of the heat generated by the viscous shearing of the ferrofluid between the rotating spindle shaft and the inner diameter of the stationary pole pieces. Some of this heat is conducted away through the pole pieces and the spindle shaft. Thus, the operating ferrofluid temperature depends on the heat-sink capabilities of the seal materials and structure, which, in turn, determines the ferrofluid evaporation rate and, therefore, the life of the seal. The operating fluid temperature is higher, when ferrofluid fills both gap regions, than when only one stage is activated with ferrofluid, and the other stage has an air gap under it. This results because each gap region filled with ferrofluid serves as an independent source of heat, thus raising the temperature of the seal structure to a higher value than if just one stage had been activated with ferrofluid.

Hence, unlike the seal pressure which doubles for both stages activated, as opposed to just one, seal life increases by having only one gap region filled with ferrofluid, and not both or a plurality of gap regions. Thus, an ideal situation would be one in which only one pole piece is activated with ferrofluid. A second pole piece, which would operate with an air gap, is used only to complete the magnetic circuit. The present seal-installation techniques, however, prohibit achieving this goal, since the ferrofluid is injected into the magnet area, which results in ferrofluid migration into both gap regions, upon the spindle shaft insertion.

It has been discovered that the life of a ferrofluid rotary-seal apparatus may be extended through the proper selection of the seal housing material and housing geometry, so as to conduct heat away from the ferrofluid in one or more of the gaps of the seal. The rapid removal of heat from the ferrofluid permits a lower ferrofluid temperature during shaft operation, resulting in reduced ferrofluid loss and an extension of seal life. An extended housing may be used, which extension overlaps the top of one or more pole pieces, or where the housing extends in contact with and along one side, preferably the outside, of the pole pieces in a heat-conductive, heat-exchange and contacting relationship. An extended housing, wherein the extension is a sheet material and is formed by swaging or staking along the outside of one or more of the pole pieces, has been found to extend seal life, as a result of the improved thermal path for heat conduction. In one embodiment, the housing extension may be formed integrally as part of the housing or formed separately adjacent the pole pieces by cladding or adhesive techniques. The conductive extension element may extend alongside the pole pieces and toward and into a close relationship with the end of the pole piece forming the gap with the surface of the rotary shaft, to hold the sealing ferrofluid, so that a thermal path extends from the area of the gap alongside the pole piece to the top or body of the housing which serves as a heat sink. It has been found, particularly with extended housings on exclusion seals used with computer-disc-drive spindles with diester ferrofluid, that a temperature reduction of 5° C. or more of the ferrofluid can be obtained, permitting an extension of seal life.

In another embodiment, the heat-conductive extension can be placed on both pole pieces, to extend seal life for single-stage and multiple-stage ferrofluid seals. The extension on one pole piece extends the seal life of the ferrofluid at that particular gap, while the ferrofluid at the other gap, running at a higher temperature, is evaporated preferentially, to provide, after such stage failure or evaporation, an air gap. If desired, the housing material may be so designed to serve as a heat sink, or to designate or otherwise conduct the accumulated heat away to a heat sink of lower temperature, depending on the degree of seal life extension desired and the housing material and geometry used.

The housing and extension should be composed of a nonmagnetic material which is highly thermal-conductive. Typical useful materials include metals, such as nonmagnetic stainless steel (series 300), copper, aluminum and other metals. The removal of heat is particularly helpful in extending seal life, where the ferrofluid has a high viscosity and, thus, provides more heat due to shearing forces.

The invention will be described for the purpose of illustration only in connection with a particularly preferred embodiment; however, it is recognized that those persons skilled in the art may make various changes and modifications to the described embodiment, without departing from the spirit and scope of the invention.

DESCRIPTION OF THE EMBODIMENTS

Figure 1:
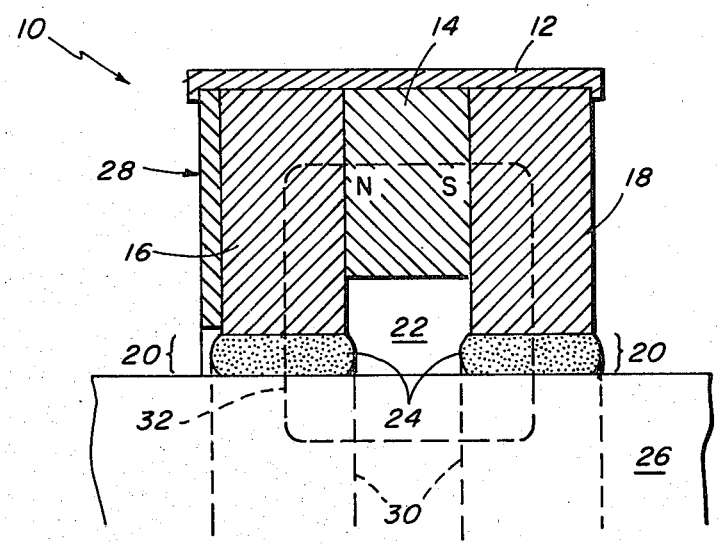
FIG. 1 is a schematic, illustrative, cross-sectional view of a ferrofluid exclusion seal of the invention at the start of the operation.

FIG. 1 shows an extended-life, ferrofluid-seal apparatus 10 which comprises a permanent-magnet ring 14 within a housing 12 formed of aluminum and having magnetically permeable pole pieces 16 and 18; for example, 30 to 45 mils in thickness, in contact with either side of the magnet 14, and adjacent opposite poles to form an annular cavity 22 therebetween. The magnet 14 and the pole pieces 16 and 18 are disposed about a rotatable shaft 26, such as a computer-disc-drive spindle. The inner diameter of each of the pole piece 16 and 18 extends into a close relationship with the surface of shaft 26, to form a gap 20 therebetween of defined width, typically 2 to 6 mils. Ferrofluid 24, such as a diester or other ferrofluid; for example, with viscosity 20 to 500 cps and a saturation magnetization of 100 to 450 gauss, is retained by the magnetic gradient in the gap 20, to form two O-ring seals 30, shown in parallel dotted lines, about the shaft 26 on rotation thereof. The closed-circuit magnetic-flux path formed is illustrated in dotted lines 32. The seal apparatus 10 has a housing extension 28; for example 10 to 40 mils in thickness and made of aluminum, illustrated as part of housing 12. The extension is placed in close contact with pole piece 16 and along the outside thereof. The free end of the extension 28 extends toward and into a close relationship with the one end of pole piece 16 which forms gap 20. The extension 28 of heat-conductive material reduces the temperature of the ferrofluid at the gap 20 under pole piece 16, during operation of the shaft 26.

Figure 2:
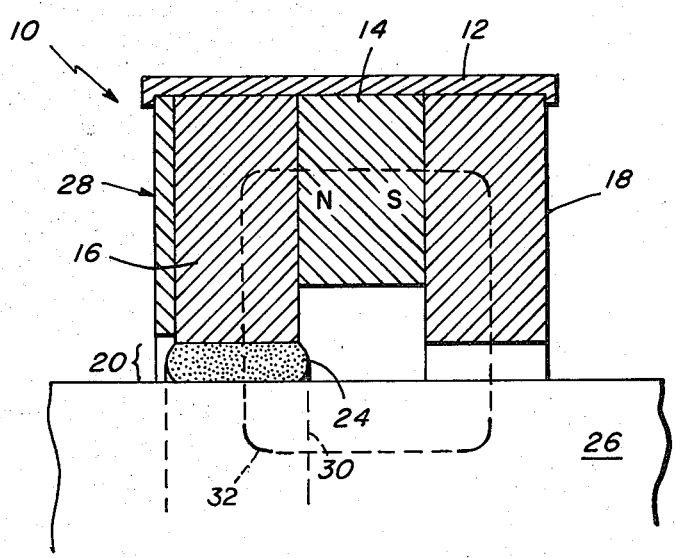
FIG. 2 is the exclusion seal of FIG. 1 after evaporation of the ferrofluid under one pole piece.

FIG. 2 illustrates the condition wherein the ferrofluid 24 in gap 20 under pole piece 18 has evaporated; that is, the seal has failed at that gap, but the seal life is extended by the ferrofluid O-ring seal 30 under pole piece 16, due to its lower temperature and, therefore, evaporation rate.

The extended-life seal apparatus, as illustrated, is particularly useful in extending seal life up to 25% over standard seals, without the heat-removing extension with computer-disc-drive spindles and diester ferrofluids.

What is claimed is:

1. A ferrofluid rotary-seal apparatus having an extended seal life, the seal apparatus adapted to seal a rotatable shaft, which seal apparatus comprises:
   (a) an annular permanent magnet adapted to surround the shaft which is to be sealed and having a one and another pole of opposite polarity;
   (b) first and second, magnetically permeable, pole-piece elements, each having an outer diameter and an inner diameter, the outer diameter of each pole piece in a magnetic-flux relationship with the one and the other ends of the permanent magnet, to form an air cavity between the pole pieces, the pole pieces adapted to surround the shaft to be sealed, the inner diameter of each pole piece adapted to extend into a close, noncontacting relationship with the surface of the shaft to form a radial gap therebetween; and
   (c) a housing to contain the magnet and the pole pieces, the housing including a nonmagnetic, heat-conductive material disposed in a close, heat-conducting relationship adjacent and extending along a substantial portion of the length of the first pole piece and toward the radial gap formed by the first pole piece,
   whereby heat, generated by the rotation of the shaft and in the ferrofluid magnetically retained in the radial gap at the end of the first pole piece, which forms an O-ring seal, is removed from the ferrofluid in the first gap by the heat-conductive material, to extend the seal life by reducing the temperature of the ferrofluid in the gap.

2. The seal apparatus of claim 1 wherein the heat-conductive material comprises a sheet material placed in contact with the exterior surface of the first pole piece, is substantially the length of the first pole piece and extends at the one extending end substantially close to the one end of the first pole piece and the radial gap thereunder.

3. The seal apparatus of claim 1 wherein the heat-conductive material is disposed adjacent and in a heat-conductive relationship with and along the second pole piece.

4. The seal apparatus of claim 1 wherein the nonmagnetic heat-conductive material is selected from the group consisting of nonmagnetic stainless steel, aluminum and copper.

5. The seal apparatus of claim wherein the heat-conductive material only is disposed adjacent and along the length of the first pole piece, and the second pole piece is free of heat-conductive material, thereby providing for the preferential evaporation of the ferrofluid at the second gap and an extension in seal life at the first gap.

6. The seal apparatus of claim 1 wherein the housing extends over the permanent magnet and the other ends of the first and second pole pieces, and the extension comprises a flat, metal, sheet material of about 10 to 40 mils in thickness and in a heat-conductive and contacting relationship to and on the first pole piece and on the pole-piece side outside of the cavity.

7. The seal apparatus of claim 1 wherein the first and second radial gaps formed by the first and second pole pieces range from about 2 to 6 mils.

8. The seal apparatus of claim 1 in combination with a rotatable shaft element and with ferrofluid magnetically retained in the radial gap under the first pole piece.

9. The seal apparatus of claim 8 wherein the rotatable shaft is a computer-disc-drive-spindle shaft.

10. The seal apparatus of claim 8 wherein the ferrofluid has a viscosity of from 50 to 500 cps and a magnetic saturation of 100 to 450 gauss.

11. In a method for extending the seal life of a ferrofluid, rotary-shaft seal apparatus, which, in sealing a rotary shaft, comprises:
 (a) surrounding the rotary shaft with an annular permanent magnet having one end and another end and having poles of opposite polarity at each end;
 (b) surrounding the rotary shaft with first and second, magnetically permeable, pole-piece elements in a magnetic-flux relationship with one and the other ends of the permanent magnet, each pole piece having a one end and another end;
 (c) surrounding the permanent magnet and the pole pieces within a nonmagnetic housing;
 (d) extending the one end of each pole piece into a close, noncontacting relationship with the surface of the rotary shaft, to form first and second gaps therebetween of defined width; and
 (e) retaining magnetically, in the first and second gaps, a ferrofluid to form at least two liquid O-ring seals on the surface of the rotary shaft, to effect sealing of the rotary shaft, the improvement which comprises
 employing a nonmagnetic, heat-conductive material extending from the housing and along the length of the first pole piece and toward the one end of the first pole piece, and in heat-conductive relationship with the first pole piece, to provide for the removal of heat from the ferrofluid in the gap formed by the one end of the first pole piece, thereby extending the seal life of the seal apparatus at the first pole piece.

12. The method of claim 11 wherein the ferrofluid has a viscosity of from about 50 to 500 cps and a magnetic saturation of 100 to 450 gauss.

13. The method of claim 11 which includes employing, as the rotary shaft to be sealed, a computer-disc-drive-spindle shaft.

14. The method of claim 11 which includes extending the heat-conductive material to substantially the one end of the first pole piece.

15. The method of claim 11 which includes bonding the heat-conductive material along the outside length of the first pole piece.

16. In combination:
 (a) a magnetically permeable, rotatable, computer-disc-drive-spindle shaft; and
 (b) a ferrofluid rotary-seal apparatus having an extended seal life, which seal apparatus comprises
  (i) an annular permanent magnet adapted to surround the shaft which is to be sealed and having a one and another pole of opposite polarity,
  (ii) first and second, magnetically permeable, pole-piece elements, each having an outer diameter and an inner diameter, the outer diameter of each pole piece in a magnetic-flux relationship with the one and the other ends of the permanent magnet, to form an air cavity between the pole pieces, the pole pieces surrounding the spindle shaft, the inner diameter of each pole piece extending into a close, noncontacting relationship with the surface of the spindle shaft, to form a radial gap therebetween,
  (iii) a housing to contain the magnet and the pole pieces, the housing including a nonmagnetic, heat-conductive material disposed in a close, contacting, heat-conducting relationship adjacent and along a substantial portion of the length of the first pole piece and extending toward the radial gap formed by the first pole piece, and
  (iv) ferrofluid magnetically retained in the radial gap under the first pole piece, to form a ferrofluid seal with the spindle shaft,
 whereby heat, generated by the rotation of the shaft in the ferrofluid magnetically retained in the radial gap at the end of the first pole piece, is removed from the ferrofluid which forms the seal in the first gap by the heat-conductive material, to extend the seal life by reducing the temperature of the ferrofluid in the radial gap.

* * * * *